United States Patent
Schmidt

(10) Patent No.: US 8,215,689 B2
(45) Date of Patent: Jul. 10, 2012

(54) MODULAR SYSTEM AND PRODUCTION PROCESS FOR MOTOR VEHICLES

(75) Inventor: Tim Schmidt, Bietigheim-Bissingen (DE)

(73) Assignee: Dr. Ing. h.c.f. Porsche Aktiengesellschaft (DE)

( * ) Notice: Subject to any disclaimer, the term of this patent is extended or adjusted under 35 U.S.C. 154(b) by 428 days.

(21) Appl. No.: 12/538,335

(22) Filed: Aug. 10, 2009

(65) Prior Publication Data

US 2010/0156145 A1 Jun. 24, 2010

(30) Foreign Application Priority Data

Oct. 22, 2008 (DE) .......................... 10 2008 052 773

(51) Int. Cl.
*B62D 25/08* (2006.01)
(52) U.S. Cl. ........... 296/24.43; 296/193.02; 296/193.04; 296/37.1
(58) Field of Classification Search ............... 296/24.33, 296/24.4, 24.43, 193.02, 193.04, 37.1, 37.6, 296/24.1; 280/749
See application file for complete search history.

(56) References Cited

U.S. PATENT DOCUMENTS

| | | | | |
|---|---|---|---|---|
| 5,301,997 A | * | 4/1994 | Cudden .................... | 296/182.1 |
| 5,788,322 A | * | 8/1998 | Wolf et al. ................. | 296/181.4 |
| 6,474,713 B1 | * | 11/2002 | Ruck et al. ................. | 296/24.43 |
| 7,520,562 B2 | * | 4/2009 | Dragoi ......................... | 296/198 |
| 7,607,709 B1 | * | 10/2009 | Bryant ....................... | 296/26.01 |
| 7,789,454 B2 | * | 9/2010 | Kim et al. .................. | 296/184.1 |
| 2005/0236199 A1 | | 10/2005 | Rahmstorf | |
| 2009/0200835 A1 | * | 8/2009 | Nilsson et al. ........... | 296/190.08 |
| 2011/0148134 A1 | * | 6/2011 | Gerhardt et al. ........... | 296/24.43 |

FOREIGN PATENT DOCUMENTS

| | | |
|---|---|---|
| DE | 4424288 | 1/1996 |
| DE | 19940986 | 3/2001 |
| DE | 102 21 950 | 11/2003 |

\* cited by examiner

*Primary Examiner* — Jason S Morrow

(74) *Attorney, Agent, or Firm* — Gerald E. Hespos; Michael J. Porco

(57) ABSTRACT

A modular system is provided for producing motor vehicles having at least first and second vehicle variants that differ from one another by having different space requirements in an accessories compartment that is separated from a luggage compartment by a partition wall. The system has a first partition wall that is secured to a side of an upper crossmember facing the accessories compartment to produce a small accessories compartment on the first vehicle variant. The system also has a second partition wall that is secured to a side of the upper crossmember facing the luggage compartment to produce a large accessories compartment on the second vehicle variant.

15 Claims, 1 Drawing Sheet

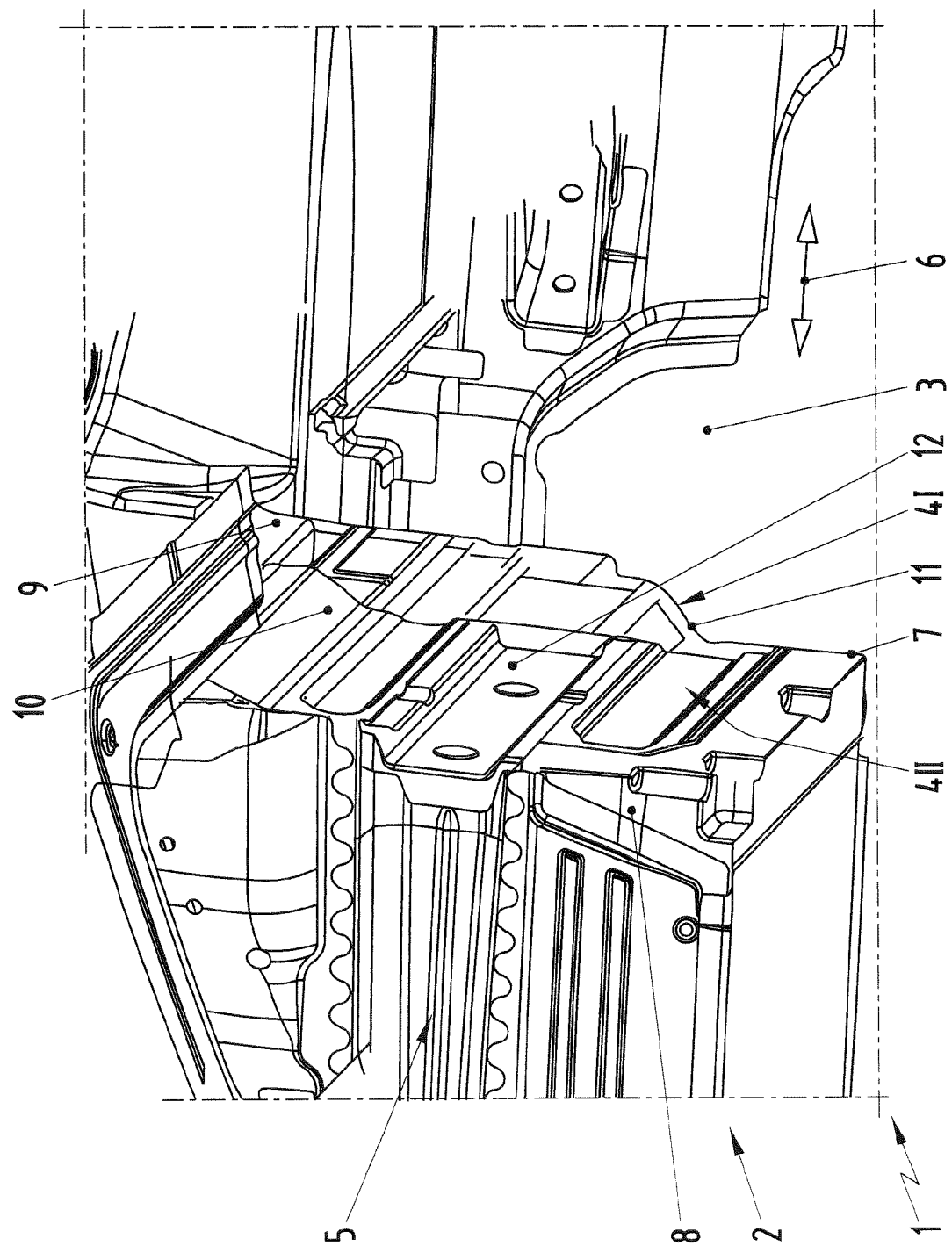

MODULAR SYSTEM AND PRODUCTION PROCESS FOR MOTOR VEHICLES

CROSS-REFERENCE TO RELATED APPLICATIONS

This application claims priority under 35 USC 119 to German Patent Application No. 10 2008 052 773.4 filed on Oct. 22, 2008, the entire disclosure of which is incorporated herein by reference.

BACKGROUND OF THE INVENTION

1. Field of the Invention

The invention relates to a modular system for producing motor vehicles having at least two vehicle variants. The invention also relates to a process for producing motor vehicles having at least two vehicle variants.

2. Description of the Related Art

Vehicle variants can differ from one another, for example, through different space requirements in an accessories compartment. For example, it is possible to arrange independent wheel suspensions for steerable and nonsteerable vehicle wheels in such an accessories compartment. A steering linkage for a steerable wheel and, if appropriate, a power-assisted steering mechanism also may be accommodated in the accessories compartment. A vehicle battery also may be accommodated in the accessories compartment. Still further, a gear unit, such as a differential gear unit for a front-wheel drive may be accommodated in such an accessories compartment. Some vehicles which are offered in a first variant with a two-wheel drive and in a second variant with a four-wheel drive. In this situation, a gear unit for splitting drive power to the wheels of the additional drive axle may be accommodated in the accessories compartment for the four-wheel variant. This additional gear unit then is not required in the two-wheel variant. The accessories compartment in specific motor vehicles can be separated from a luggage compartment by a partition wall. This is particularly the case with rear-engine vehicles in which the luggage compartment and the accessories compartment are accommodated in a forward structure of the vehicle body.

DE 102 21 950 A1 discloses a motor vehicle with a bulkhead module. The bulkhead usually separates an engine compartment from a vehicle passenger compartment. The bulkhead module of DE 102 21 950 A1 is designed so that it can contain functional units, such as, for example, a fan for ventilating the passenger compartment, or the like. The module comprises a yoke beam that is fastened to two longitudinal members of a vehicle body.

The invention was made in view of the above-described problem, and it is an object of the invention to produce vehicles in a way that makes it possible for vehicle types that differ from one another through different space requirements in the accessories compartment to be produced as inexpensively as possible.

SUMMARY OF THE INVENTION

The invention is based on the general idea of using partition walls that are designed differently and that can be fastened in different ways at least in the region of an upper crossmember to be able to comply with the variants of the partition wall and of the space requirement for the production of the different vehicle variants. For example, a first vehicle variant may require a smaller space in the accessories compartment than a second vehicle variant. In this case, a first partition wall is provided for fastening to the upper crossmember on a side facing the accessories compartment. As a result, the accessories compartment is reduced in the region of the upper crossmember by the total width of the upper crossmember. The accessories compartment can be made significantly smaller to the benefit of the luggage compartment by appropriately designing or configuring the first partition wall. The second vehicle variant may require a larger space requirement in the accessories compartment than the first vehicle variant. In this case, a second partition is provided for fastening to the upper crossmember on a side facing away from the accessories compartment. As a result, the accessories compartment is increased in the region of the upper crossmember by the total width of the upper crossmember. The volume of the accessories compartment can be increase significantly at the expense of the luggage compartment by appropriately configuring the second partition wall. The two partition wall variants provide a particularly simple way to achieve two accessories compartments of different sizes without require further structural measures. Consequently, the variants for the vehicle can be achieved comparatively inexpensively.

The two partition wall variants advantageously can be fastened to a lower crossmember of the vehicle body at the same fastening points, for example on a side facing the accessories compartment. It is also possible that the lower crossmember has first fastening points for the first partition wall and second fastening points for the second partition wall. The first and second fastening points are used alternatively depending on the vehicle variant. It is also possible that one, some or all of the fastening points are used cumulatively in both partition wall variants. The proposed construction method thus makes it possible to simplify the formation of variants. In particular, the effort involved in adapting production machines, such as, for example, welding robots, can also be reduced if substantially identical fastening points are used with the different partition walls.

The different partition walls for both vehicle variants can be fastened to mutually opposite side walls of the vehicle body in identical fastening regions. Thus identical fastening regions or identical fastening points are also used for the lateral attachment of the partition walls to the vehicle body, thereby simplifying the formation of variants.

According to a further advantageous embodiment, to produce. The second vehicle variant has more space available in the accessories compartment. In this situation, the second partition wall can be supplemented by a reinforcing member that can be fastened to the second partition wall on a side facing the luggage compartment and to mutually opposite side walls of the vehicle body. The reinforcing member strengthens the second partition wall. Moreover, the second partition wall strengthened by the reinforcing member can be used better to fasten additional accessories in the accessories compartment. Thus, in contrast to the first vehicle variant, those accessories that must be arranged in the enlarged accessories compartment can be fastened to the second partition wall.

Further important features and advantages will become apparent from the drawings and from the associated description of the figures. The features mentioned above and explained below can be used in the combination indicated, in other combinations or on their own without departing from the scope of the invention.

BRIEF DESCRIPTION OF THE DRAWING

FIG. 1 is the only FIGURE and shows a partly sectioned perspective view of a vehicle body in the region of a partition wall in two different variants.

DETAILED DESCRIPTION OF THE PREFERRED EMBODIMENT

A motor vehicle in accordance with the invention is identified by the numeral 1 in FIG. 1. The motor vehicle 1, represented only in part, comprises a vehicle body 2 that likewise is represented only in part. The vehicle body 2 has an accessories compartment 3 for accommodating accessories in the region of a forward structure or alternatively in the region of a rearward structure of the vehicle 1. A partition wall 4 separates the accessories compartment 3 from a luggage compartment 5 that is adjacent to the accessories compartment 3 with respect to a vehicle longitudinal direction 6 indicated by the double arrow. FIG. 1 shows two different variants of this partition wall 4; however, these variants are installed exclusively as alternatives. A first variant of the partition wall 4 is designated below by 4I, while a second variant of the partition wall 4 is designated below by 4II.

The body 2 has a lower crossmember 7 in the region of the partition wall 4. The lower cross member 7 extends transversely with respect to the vehicle longitudinal direction 6 and interconnects two side walls 8 of the vehicle 1, only one of which can be seen in FIG. 1, however. The body 2 further has an upper crossmember 9 in the region of the partition wall 4. The upper crossmember 9 also extends transversely with respect to the vehicle longitudinal direction 6 and is fastened at its longitudinal ends to the two side walls 8.

The vehicle 1 has first and second vehicle variants that differ from one another in the size of the accessories compartment 3. The first vehicle variant has a smaller space requirement in the accessories compartment 3. As a result, the accessories compartment 3 is smaller in the first vehicle variant than in the second vehicle variant. In contrast, the second vehicle variant has a larger space requirement in the accessories compartment 3. Accordingly, the accessories compartment 3 in the second vehicle variant is larger than in the first vehicle variant. The different sizes for the accessories compartments in the first and second vehicle variants are achieved by using different partition walls 4. More particularly, the first partition wall 4I is used for the first vehicle variant and is fastened to sides of the lower and upper crossmembers 7 and 9 that face the accessories compartment 3, as shown in FIG. 1. By contrast, the second partition wall 4II is used for the second vehicle variant. The second partition wall 4II is fastened to the side of the upper crossmember 9 that faces away from the accessories compartment 3 and is fastened to the side of the lower crossmember 7 that facing the accessories compartment 3. Fastening the second partition wall 4II to the side of the upper crossmember 9 facing away from the accessories compartment 3 increases the volume of the accessories compartment 3 by the width of the upper crossmember 9. A portion 10 of the second partition wall 4II near the upper crossmember 9 is inclined to project more deeply into the luggage compartment 5. In contrast, a portion 11 of the first partition wall 4I near the lower crossmember 7 is inclined to project more deeply into the accessories compartment 3. Also, the lower crossmember 7 is offset relative to the upper crossmember 9 in the vehicle longitudinal direction 6, so that the lower crossmember 7 is offset toward the luggage compartment 5 and the upper crossmember 9 is offset toward the accessories compartment 3. As a result, a fairly simple reconfiguration of the two partition walls 4 enables a relatively large volume to be assigned to the luggage compartment 5 to the detriment of the accessories compartment by using the first partition wall 4I or enables a relatively large volume to be assigned to the accessories compartment 3 to the detriment of the luggage compartment 5 by using the second partition wall 4II. Each partition wall 4I, 4II preferably is fastened to the side of the lower crossmember 7 facing the accessories compartment 3 at the same fastening points. The partition walls 4 usually are affixed to the body 2 by weld spots. Thus, the same welding parameters can be used so that a welding robot does not have to be reprogrammed in this respect. The partition walls 4 also are fastened to the side walls 8 to produce the body 2. Preference is given to an embodiment in which the same fastening points or the same fastening regions are used for both partition wall variants 4I, 4II. Here too, welded connections are preferred for the attachment between the side walls 8 and the partition walls 4.

The second vehicle variant may include a reinforcing member 12 in addition to the second partition wall 4II. The reinforcing member 12 is fastened to the second partition wall 4II and to the side walls 8 by welded connections. In the preferred embodiment, the reinforcing member 12 is on the side of the second partition wall 4II facing the luggage compartment 5 and is connected to the side walls 8 on this side of the second partition wall 4II.

The two vehicle variants differ in that the first vehicle variant, which has a smaller space requirement in the accessories compartment 3, features a two-wheel drive, while the second vehicle variant, which has a larger space requirement for the accessories compartment 3, features a four-wheel drive. The enlarged accessories compartment 3 in the second vehicle variant accommodates an additional gear unit for driving the wheels of the additional drive axle. The vehicle 1 preferably has a rear engine so that the luggage compartment 5 is in a forward structure of the vehicle 1.

A modular system preferably is available for producing the two vehicle variants and comprises at least two different partition walls 4I and 4II. The modular system may optionally comprise the reinforcing member 12. The first partition wall 4I or the second partition wall 4II with or without the reinforcing member 12 is installed depending on the particular vehicle variant.

What is claimed is:

1. A modular system for motor vehicles having at least first and second vehicle variants, each vehicle variant having a vehicle body with an upper crossmember, an accessories compartment and a luggage compartment at locations in the vehicle body in proximity to the upper crossmember, the modular system comprising:
    a first partition wall selectively fastened to a side of the upper crossmember facing the accessories compartment to produce the first vehicle variant with a smaller space requirement in the accessories compartment; and
    a second partition wall selectively fastened to a side of the upper crossmember facing away from the accessories compartment to produce the second vehicle variant with a larger space requirement in the accessories compartment.

2. The modular system of claim 1, wherein the vehicle body further has a lower crossmember, the first and second partition walls being fastened to substantially common positions on the lower crossmember.

3. The modular system of claim 2, wherein the vehicle body further has opposite side walls the fist and second partition walls being fastened to substantially common positions on the side walls.

4. The modular system of claim 1, further comprising a reinforcing member selectively fastenable to a side of the second partition wall facing the luggage compartment.

5. The modular system of claim 1, wherein the first vehicle variant has a two-wheel drive and the second vehicle variant has a four-wheel drive.

6. The modular system of claim 1, wherein the luggage compartment is a forward structure of the vehicle body.

7. A modular system for motor vehicles having at least first and second vehicle variants, each vehicle variant having a vehicle body with opposite side walls and upper and lower crossmembers extending between the side walls, each of the first and second vehicle variants further having an accessories compartment on a first side of the upper and lower crossmembers and a luggage compartment on a second side of the upper and lower crossmembers, the modular system comprising:
 a first partition wall selectively fastened to the first side of the upper crossmember, the first side of the lower crossmember and the opposite side walls on the second vehicle variant; and
 a second partition wall selectively fastened to the second side of the upper crossmember, the first side of the lower crossmember and the opposite side walls, whereby the accessories compartment of second vehicle variant is larger than the accessories compartment of the first vehicle variant.

8. The modular system of claim 7, further comprising a reinforcing member selectively fastenable to a side of the second partition wall facing the luggage compartment.

9. The modular system of claim 7, wherein the first and second partition walls are secured to identical positions on the lower crossmember and the side walls.

10. A process for producing motor vehicles having at least first and second vehicle variants that differ from one another by different space requirements in an accessories compartment that is separated from a luggage compartment by a partition wall, the process comprising:
 securing a first partition wall between the accessories compartment and the luggage compartment for the first vehicle variant at a side of an upper crossmember of a vehicle body facing the accessories compartment; and
 securing a second partition wall between the accessories compartment and the luggage compartment for the second vehicle variant at a side of the upper crossmember facing the luggage compartment, wherein the first and second partition walls are configured differently from one another so that the accessories compartment produced with the second partition wall is larger than the accessories compartment produced with the first partition wall.

11. The process of claim 10, further comprising fastening both partition walls to a first side of a lower crossmember of the vehicle body.

12. The process of claim 11, further comprising fastening both partition walls to identical fastening regions on the first side of a lower crossmember of the vehicle body.

13. The process of claim 12, further comprising fastening partition walls to opposite side walls of the vehicle body at identical fastening regions.

14. The process of claim 13, further comprising fastening the partition walls to the lower crossmember and the opposite side walls of the vehicle body by a robotic welder.

15. The process of claim 10, further comprising fastening a reinforcing member to a side of the second partition wall facing the luggage compartment.

* * * * *